May 13, 1924.
G. L. HESS
1,493,539
PICKING SHEARS
Filed Sept. 22, 1921
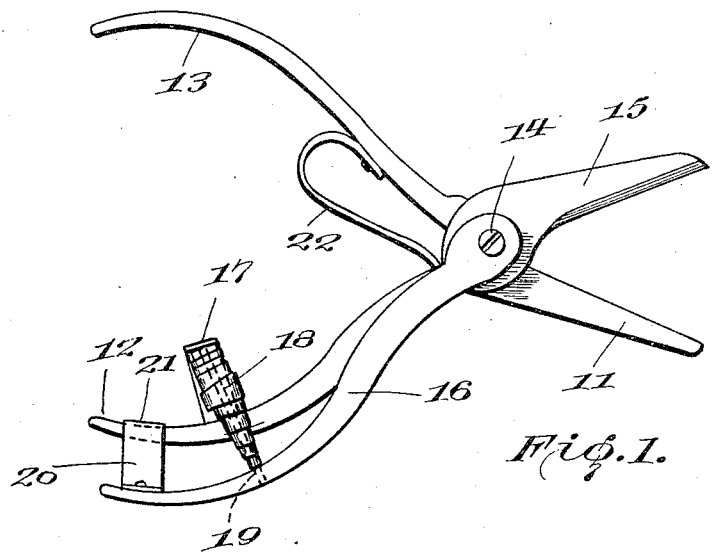
Fig.1.
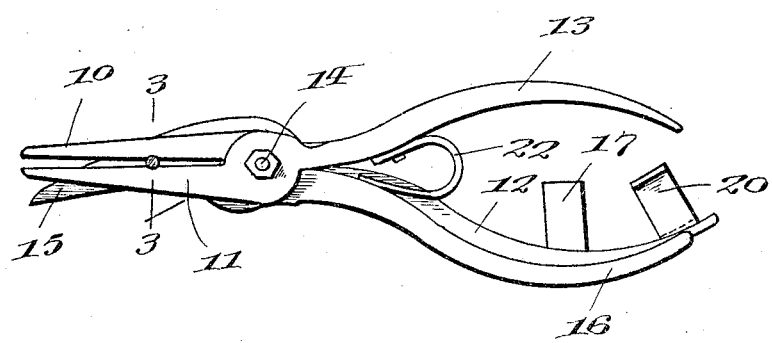
Fig.2.
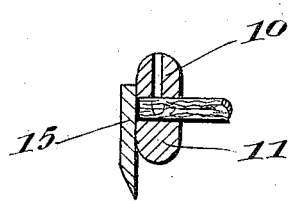
Fig.3.
Inventor:
George L. Hess.
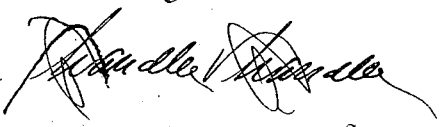
Attorneys.

Patented May 13, 1924.

1,493,539

UNITED STATES PATENT OFFICE.

GEORGE L. HESS, OF PULTENEY, NEW YORK, ASSIGNOR OF ONE-HALF TO THOMAS A. MURRAY, OF HAMPTON, VIRGINIA.

PICKING SHEARS.

Application filed September 22, 1921. Serial No. 502,422.

*To all whom it may concern:*

Be it known that I, GEORGE L. HESS, a citizen of the United States, residing at Pulteney, in the county of Steuben, State of New York, have invented certain new and useful Improvements in Picking Shears; and I do hereby declare the following to be a full, clear, and exact description of the invention, such as will enable others skilled in the art to which it appertains to make and use the same.

This invention relates to new and useful improvements in fruit picking devices.

One object of the present invention is to provide a fruit picking device, and especially a device for picking grapes whereby the stem of the bunch of grapes will be firmly held by the picking device after the stem has been severed from the vine.

Another object is to provide a device of this character wherein the implement is adapted for use with one hand, thus permitting the other hand to remove the bunch of grapes, and wherein the cutting and gripping actions are performed by a single movement of the implement.

Other objects and advantages will be apparent from the following description when taken in connection with the accompanying drawing.

In the drawing:

Figure 1 is an elevation of a fruit picking implement made in accordance with the invention.

Figure 2 is an elevation of the implement showing the same in position after having severed the stem of a piece of fruit, or a bunch of grapes, and the stem gripped between the jaws.

Figure 3 is an enlarged transverse sectional view through the jaws and cutting blade, on the line 3—3 of Figure 2.

Referring particularly to the accompanying drawing, 10 and 11 represent a pair of gripping jaws, having the handles 12 and 13 respectively, the jaws being pivotally connected at 14. Pivotally mounted on the pivot pin 14, of the jaws 10 and 11, is a cutting blade 15, the same having a handle shank 16 extending rearwardly at one side of the handle 12. The cutting edge of the blade 15 normally lies flush with the inner face of the jaw 10, with the handle 16 extended to a greater distance from the handle 13, than that at which the handle 12 extends.

Mounted on the inner face of the handle 12, and projecting inwardly toward the handle 13, is a substantially Z-shaped bracket 17, and secured to the outer transverse end portion of this bracket is the end of a double volute spring 18, the other end of the spring being connected to the handle 16 by the pin or lug 19, carried by said handle 16, and which pin is disposed in the adjacent end of the spring. Carried by the outer end of the handle 16 is a substantially Z-shaped member 20, the outer transverse portion 21, of which, extends across and engages with the adjacent end of the handle 12, to limit the outward or opening movement of the handle 16, under the influence of the double volute spring 18. A leaf spring 22 is secured to the inner face of the handle 13 and has its outer end bearing against the handle 12, adjacent the pivot point thereof, to normally urge the jaws into open position. The gripping jaw 11 cooperates with the jaw 10 to grip the stem of the fruit, and also cooperates with the cutting edge of the blade 15 to sever the stem of the fruit.

In the operation of the device the jaws being normally in open position, the implement is moved into such position that the stem of the fruit is disposed between the jaws. Upon pressing the handles 12 and 13 together the jaws will firmly grip the fruit stem, and upon further pressure upon the handles, the handle 16 will be moved inwardly into alinement with the handle 12, and the cutting blade 15 moved across the jaw 11 with the result that the fruit stem will be severed. The portion of the stem, below the point of severance will be firmly gripped between the jaws 10 and 11, so that the operator can readily and easily remove the fruit by simply relieving the pressure on the handles of the implement, when the spring 22 will move the jaws into open position, and the spring 18 move the cutting blade 15 away from the jaw 11.

With this implement the operator can reach into the depths of the foliage of a grape vine, or fruit tree, clip the desired fruit from the plant, and withdraw the implement without danger of dropping the fruit.

What is claimed is:

1. A device of the character described, comprising gripping jaws and a cutting blade carried by a common pivot, handles extending rearwardly from the gripping jaws and cutting blade, means for forcing the cutter blade into alignment with one of the gripping jaws, and a substantially Z-shaped member carried by the cutter handle and co-operating with the adjacent gripper handle to hold the cutting blade in aligned position.

2. A fruit clipping and holding device comprising a pair of gripping jaws, handles extending rearwardly from the gripping jaws, a cutting blade, said cutting blade and gripping jaws being carried by a common pivot, a handle extending rearwardly from the cutting blade at the outer side of one of the gripper handles and being of approximately the same length as the gripper handle, a substantially Z-shaped bracket secured to the gripper handle adjacent the cutter handle, a double volute spring, one end secured to said bracket, the other end bearing against the cutter handle for forcing the cutting blade into alignment with one of the gripping jaws and a second substantially Z-shaped member carried by the cutter handle and co-operating with the adjacent gripper handle for holding the cutting blade in alignment with the gripping jaw.

3. A fruit clipping and holding device comprising a pair of gripping jaws, handles extending rearwardly from the gripping jaws, a cutting blade, said cutting blade and gripping jaws being carried by a common pivot, a handle extending rearwardly from the cutting blade at the outer side of one of the gripper handles and being of approximately the same length as the gripper handle, means secured to and extending between the cutter handle and the adjacent gripper handle for forcing the cutting blade into alignment with one of the gripping jaws, and a substantially Z-shaped member carried by the cutter handle and cooperating with the adjacent gripper handle for holding the cutting blade in alignment with the gripping jaw.

4. A fruit clipping and holding device comprising a pair of gripping jaws, handles extending rearwardly from the gripping jaws, a cutting blade, said cutting blade and gripping jaws being carried by a common pivot, a handle extending rearwardly from the cutting blade at the outer side of one of the gripper handles and being of approximately the same length as the gripper handle, a substantially Z-shaped bracket secured to the gripper handle adjacent the cutter handle, a spring having one end secured to said bracket, the other end bearing against the cutter handle for forcing the cutting blade into alignment with one of the gripping jaws, and means for holding the cutting blade in alignment with the gripping jaw.

In testimony whereof, I affix my signature, in the presence of two witnesses.

GEORGE L. HESS.

Witnesses:
 MAE B. STRATHMAN,
 E. M. PRENTISS.